Patented Dec. 17, 1946

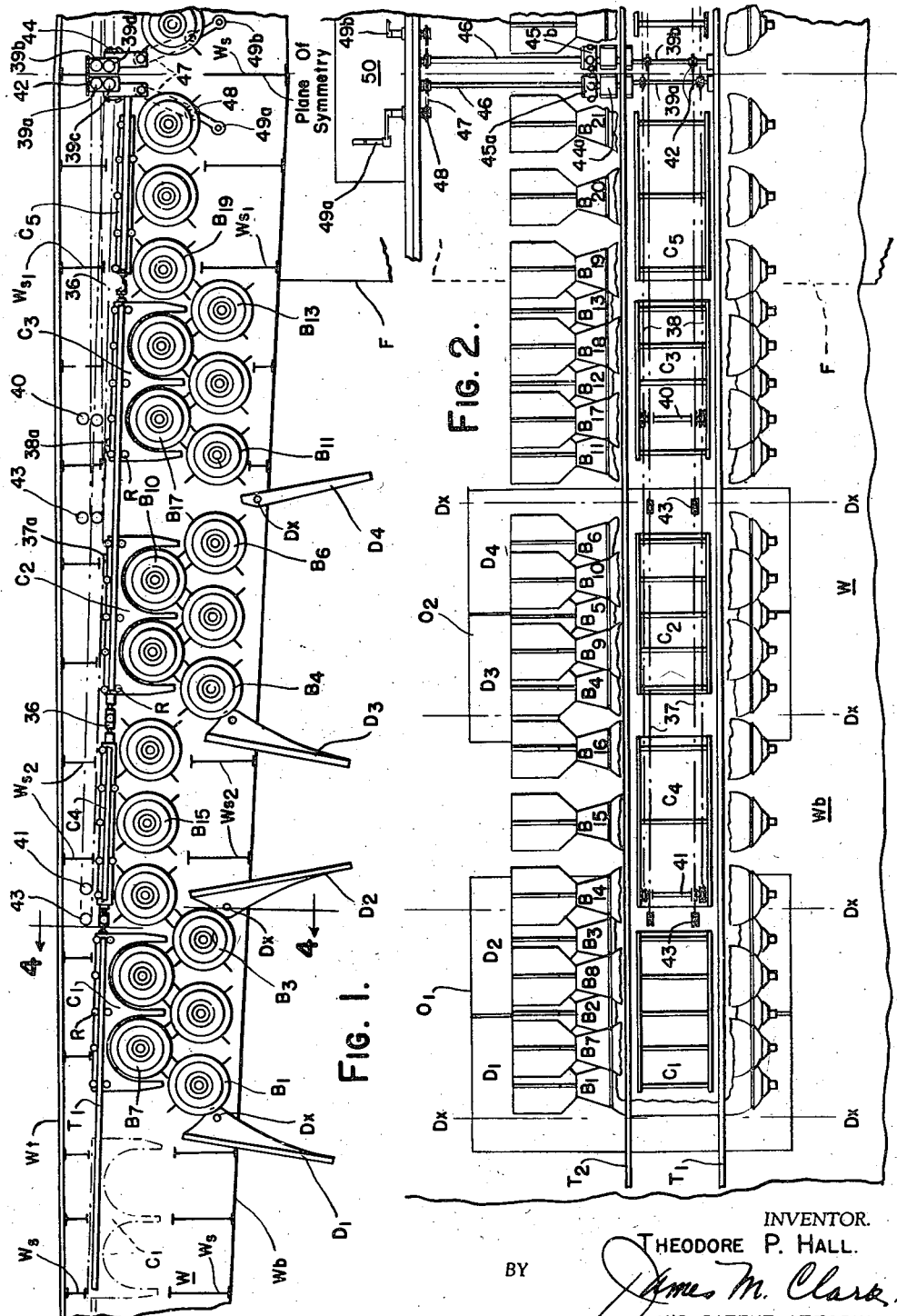

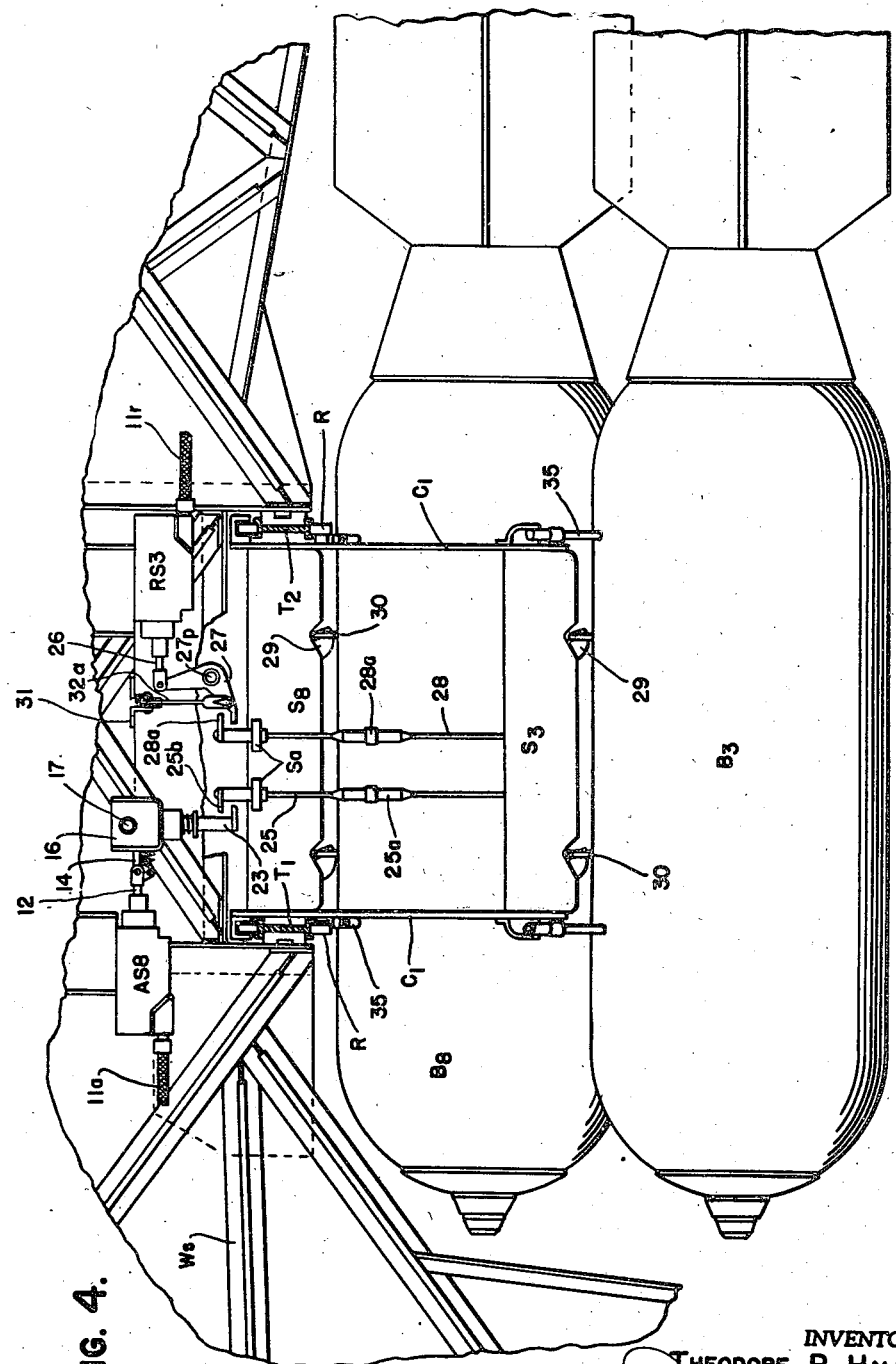

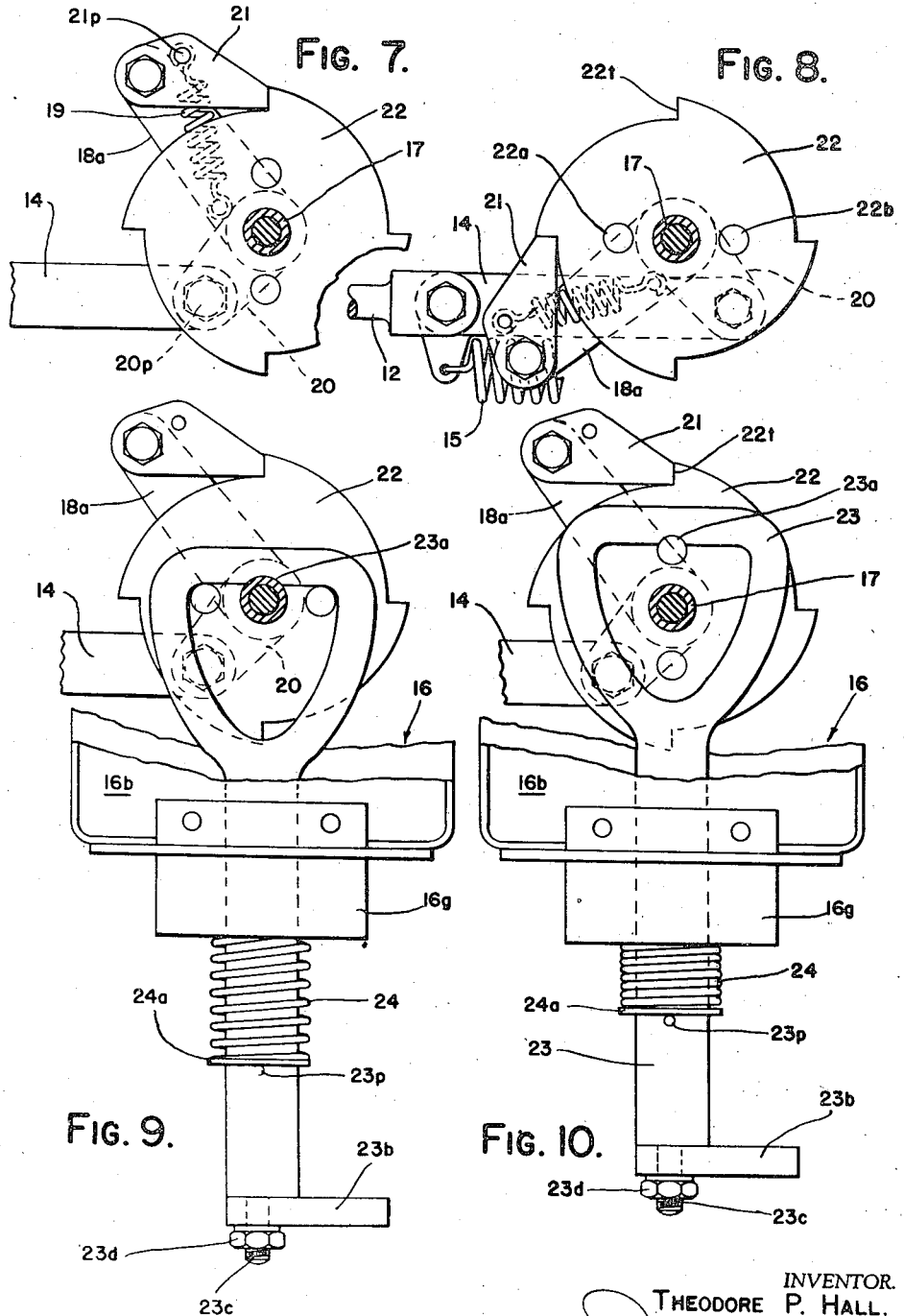

2,412,729

UNITED STATES PATENT OFFICE 2,412,729

AIRCRAFT LOAD HANDLING SYSTEM

Theodore P. Hall, San Diego, Calif., assignor to Consolidated Vultee Aircraft Corporation, a corporation of Delaware Application September 9, 1941, Serial No. 410,128

16 Claims. (Cl. 89—1.5)

The present invention relates to systems for handling loads in aircraft, and more particularly to methods and apparatus for loading, storing and discharging bomb and cargo loads as carried within aircraft wings.

The present invention has its greatest utility in its application to the wings of relatively large aircraft, although certain features may be used in smaller airplanes of both the land and water type. Bomb and other load-carrying aircraft have been proposed and used where the bombs, or other cargo loads, have been carried either in the fuselage or in the wings, and in certain instances it has been proposed that the racks or carriages on which the bombs are supported may be translated either laterally or vertically to suitable positions from which these loads may be dropped or discharged. The present invention relates to improvements in load-carrying systems of this general type in which a greater number of heavier type bombs may be efficiently accommodated within aircraft wings than have heretofore been possible, and in which the requirements of minimum weight and maximum reliability are adequately met. This invention is not limited to the local mechanism actually coming in contact with the bombs for arming, supporting and releasing the same, which mechanism is usually referred to as the bomb rack, inasmuch as any suitable bomb rack is adapted to be used in conjunction with the systems herein described.

In the design of large load-carrying aircraft of either the land or seaplane type, it is a primary requisite that the greatest utility be made of the available load space; that such occupied space be as close to the center of gravity of the airplane as possible, and that these spaces be accessible from a minimum number of openings of the smallest size to facilitate loading and discharging of the cargo. In the case of bomb-carrying aircraft or those from which loads are discharged in flight, it is particularly desirable that the openings be disposed where the loads will fall clear of other parts of the aircraft, that the bombs be at all times accessible for manual servicing and arming in flight, and that any translation of the load within the airplane be made in such a manner that the center of gravity of the craft is not materially disturbed. In this connection it is relatively important, particularly in bombing operations during the bomb aiming or sighting operation immediately preceding the release of the bombs, that the airplane is not retarded in flight by the necessity of early opening of the bomb doors, or that it be laterally unbalanced due to shifting of the load and its resulting effect upon the location of the lateral center of gravity of the airplane. The arrangements hereinafter more fully described obtain the aforementioned desirable results while eliminating many of the deficiencies of prior devices.

It is accordingly a primary object of the present invention to provide efficient load-handling apparatus enclosed completely within the aerodynamic surfaces of an aircraft wing in which the loads or bombs are supported on carriages translatable along tracks, and, wherein the bombs are at all times ready for release subject only to their being moved over the bomb doors or into the bomb dropping positions. A further object resides in an arrangement in which the bombs are completely accessible for servicing and manual arming in flight and in which a large number of bombs may be carried within the wing with a minimum number of bomb door openings, which might consist of one opening in the lower surface of each half wing or a plurality of bomb doors in each half wing, depending upon the maximum number of bombs desired to be released at any one time. It is a further object of the present invention to provide a bomb or other load handling system which will permit the single handling of the bombs as they are stowed into the aircraft, as distinguished from prior systems in which the loads had to be handled a second time in hoisting them on to the carriages.

A further object of the present invention resides in the provision of a relatively small bomb door opening for the handling of a given number of bombs and in which there is no discontinuity or interruption of the wing surface covering and stringers, except that incident to the relatively small openings themselves. A further and no less important object of the present invention is the provision of a cargo carriage train installation in a commercial airplane for the transport of various cargo including heavy commercial items such as airplane engines, machinery, etc., carried in cargo carriages which are readily converted, with the minimum of trouble, into bomb carriage installations in time of war. A further corollary object resides in the provision of such cargo carriages within the wing whereby heavy commercial cargoes can be readily hoisted on to the carriages by use of individual hoists built into each carriage, and stowed within the wing while on the carriages for transportation over long distances and lowered to the ground or small boats, and in which the passenger accommodations normally carried within the body of the same airplane are not disturbed.

Other objects and advantages of the present invention may occur to those skilled in the art after a reading of the present specification and the accompanying drawings forming a part hereof, in which:

Fig. 1 is a front sectional elevation of the inner portion of an airplane wing, as viewed looking aft, embodying the present invention;

Fig. 2 is a plan view as taken within the wing shown in Fig. 1;

Fig. 4 is a cross-sectional elevation taken along the lines 4—4 of Fig. 1;

Fig. 7 is a detail view of the ratchet mechanism of Fig. 5 shown in the "armed" position;

Fig. 8 is a detailed view of the same shown in the "safe" position;

Fig. 9 is a view of the arming slide bar shown in the "safe" position and the ratchet mechanism in the intermediate position prior to its return to that shown in Fig. 8;

Fig. 10 is a similar view of the arming bar in the "armed" position.

Figure 3:
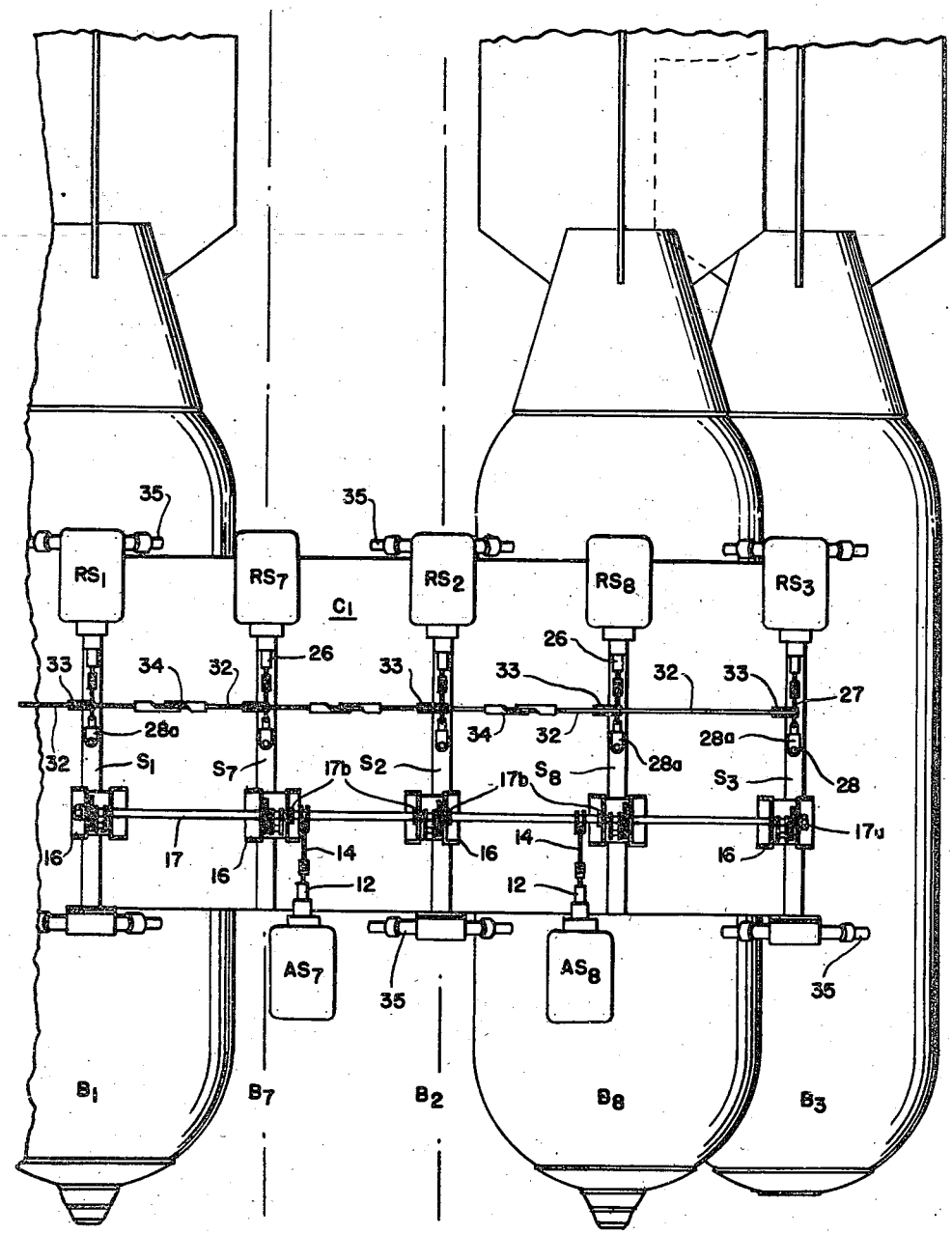
Fig. 3 is an enlarged plan view of the outer bomb carriage shown at the left in Figs. 1 and 2.

Referring now to Figs. 1 and 2 there is shown the inner portion of a cantilever wing W of an airplane, the fuselage or hull of which is indicated at F. The arrangement of the wing and the hull shown in the drawings is for a high wing flying boat although the invention is equally applicable to low wing aircraft of either the water or land type. The wing W is provided with wing bulkheads indicated generally as Ws, and all except the bulkhead on the plane of symmetry are provided with the openings shown for the movement of the carriages. Bulkhead Ws1 carries the attachment fitting for supporting the hull F to the wing W, and the bulkheads Ws2 support the inboard engine to the wing. The wing is enclosed within suitable top skin covering Wt and lower surface covering Wb.

The lower surface Wb of the wing is provided with rectangular openings O1 and O2, the former being disposed between inboard and outboard wing engines, and the opening O2 being disposed between the inboard engine and the side of the hull or fuselage. These openings are provided with pairs of doors D1—2 and D3—4 respectively, which are pivotally mounted on hinged axes Dx which extend in a chordwise, or longitudinal, direction. These doors are arranged such that in their closed positions the lower surface Wb of the wing is substantially flush and continuous and offers no unnecessary resistance of the wing in flight. The wing on each side of the plane of symmetry is provided with a track composed of parallel rails T1 and T2 which are supported to the wing bulkheads and extend from a point adjacent the plane of symmetry of the airplane outwardly toward the wing tips well beyond the outer opening O1. These rails are of channel or I-beam cross-section, as indicated in Fig. 4, and are preferably made up from extruded aluminum alloy sections suitably supported at each chordwise bulkhead.

A series of carriages C1 to C5 inclusive are provided with rollers R upon which they may be moved laterally, or spanwise of the wing, along the rails T1 and T2. The carriages C1, C2 and C3 are identical and each is provided with shackles 8 for the support of a plurality of bombs arranged in two superposed tiers. These three identical carriages each accommodate five bombs, of which B1, B2 and B3 are suspended in the lower row from shackles S1, -2 and -3 respectively, and at equal distances as measured spanwise of the wing. Each of the carriages C1 to C3 inclusive is shaped and provided with upper shackles S7 and S8 to accommodate and support the two bombs B7 and B8 in the upper tier which are spaced apart the same distance as the lower tier of bombs but are staggered in respect thereto such that each bomb in the upper tier is disposed centrally above the space between the two adjacent bombs beneath it in the lower tier.

The carriages C4 and C5 differ from those which have just been described in that they each have but three upper shackles for the accommodation of three upper tier bombs in each carriage. In the case of the carriage C4 the bombs are thus numbered B14, B15 and B16 and on the carriage C5 are supported the bombs B19—20 and B21. The arrangement of the shackles in each carriage is disclosed in Fig. 4, in which the upper shackle S8 is shown at the elevation of, and extending between the rails T1 and T2, and the lower shackle S3 being suspended by the carriage structure C1 to support the lower bomb B3. The shackles are of any suitable detailed construction, and are provided with suitable arming and release mechanism, all of which is well known to those skilled in the art. The shackles are each provided with a pair of disengageable bomb hooks 29 which engage the rings 30 carried by the bomb, and also with adjustable telescoping bomb chocks 35 to prevent rocking or swaying of the bombs upon the hooks 29.

The carriages C1, C4 and C2 are each interconnected by means of the links or couplings 36 which have the effect of converting these three carriages into a single continuous train operable along the outer portions of the track. Similarly, the carriages C3 and C5 are coupled together by similar links 36 such that they form a two-carriage unit translatable spanwise along the track, independently of the outer train of carriages. The carriage arrangement just described for the right or starboard portion of the wing W is duplicated by a similar and symmetrically disposed arrangement of one three-car and one two-car train of carriages on the left or port wing portion of the airplane. Only a small portion of the center section of this part of the wing is shown at the right hand side of Figs. 1 and 2 which are viewed looking rearwardly or aft toward the tail of the airplane. The bomb handling installation shown in these figures has been designed for the accommodation of 1,000 lb. bombs, although the invention is applicable to either larger or smaller sizes.

The weight of the thirteen bombs in the outer carriage train in the arrangement shown is accordingly 13,000 pounds, and in order that the airplane be maintained in a laterally balanced or trimmed condition, bomb carriage actuating mechanism has been provided to preferably move the two outer trains outwardly in unison such that the center of gravity of the bombs in the carriages will at all times be substantially maintained at the plane of symmetry of the airplane. Similarly, the two inboard trains of carriages are also preferably simultaneously actuated such that their center of gravity also remains substantially at the plane of symmetry of the craft. The outboard train of carriages for the right or starboard wing as shown in Figs. 1 and 2 is translated laterally by means of two parallel strands of actuating cables 37 to which are fastened attachments 37a which engage portions of the innermost carriage C2 of the outer train. The actuating cables 37 are connected at their inner terminals to the ends of two strands of chain or similar flexible transmission elements of a positive nature which engage the sprockets 42 keyed or fixed to the shaft 39b. The inner train comprising the carriages C3 and C5 on the starboard wing portion are similarly actuated by the attachments 38a engaging the carriage C3, these attachments being similarly fixed to move in a spanwise direction with the strands of flexible transmission elements 38 engaging similar more widely spaced apart sprockets 42 on the lower shaft 39c. Similarly, the shaft 39a in the upper left hand corner of the driving unit, as shown in Fig. 1, drives through its attached sprockets the chain and cable which actuates the inner train on the opposite or port side of the aircraft; and in a like manner the sprockets fixed to the lower shaft 39d in the lower right hand corner of the unit actuate the outer train of carriages on the same or port side of the airplane.

Actuating motors 45a and 45b drive the inner and outer pairs of trains respectively, the motor 45a transmitting its power through a reduction gear box 44a to drive the shafts 39a and 39c, the inner port and starboard trains, respectively. Similarly, the motor 45b drives shafts 39b and 39d through a similar gear box to actuate the outer starboard and port trains, respectively. The motors 45a and 45b may be electrical, hydraulic or any other suitable type for which a source of power is available in the airplane. In the event of failure of these motors, or for other reasons, manual emergency handcranks 49a and 49b are positioned where they can be conveniently operated from the crew work platform 50. These handcranks each have mounted thereon sprockets 48 driving similar sprockets on the shaft 46 through the chain drive 47, the shaft 46 being connected through the gear boxes 44 with suitable declutching devices for disengaging the same when the power drives are being used.

The arrangement of the mechanism for arming and releasing the bombs is shown in Figs. 3 and 4. The arming of the bombs is accomplished by means of solenoids connected in electrical circuits with suitable switch apparatus to selectively energize the desired solenoids. These solenoids are provided only at the bomb dropping stations or positions as determined by the location of the doors O1 and O2 in Fig. 2. Two arming solenoids are provided at each of these bomb dropping positions, preferably being located, in the case of the outer bomb carriage C1, over bombs 7 and 8, the solenoids being designated AS—7 and AS—8 suitably connected by the wiring 11a.

Figure 6:
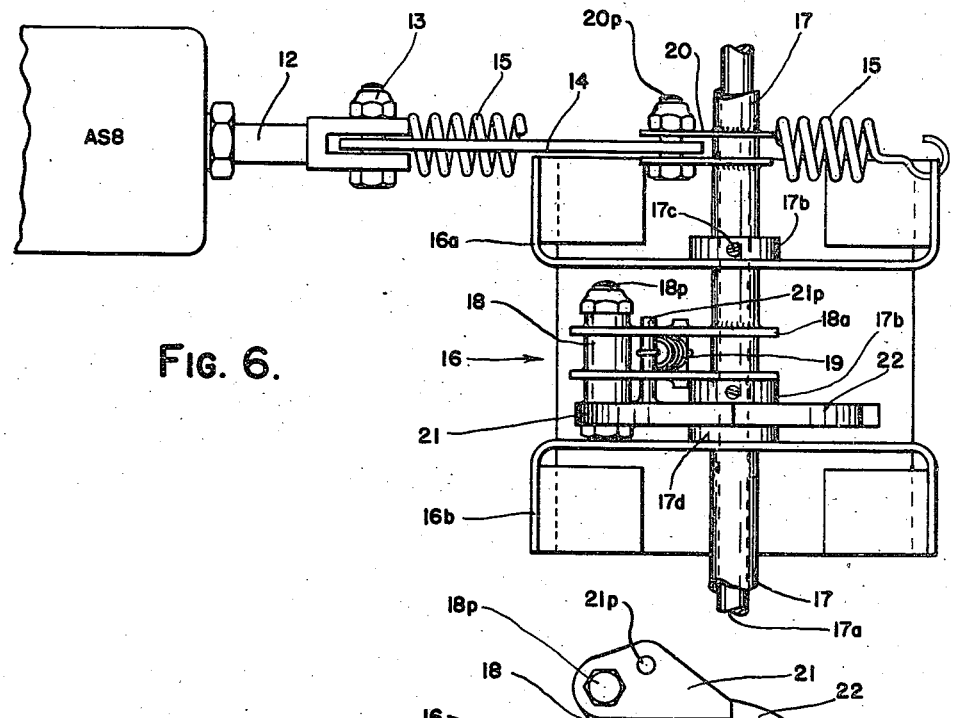
Fig. 6 is a plan view of the same.
Figure 5:
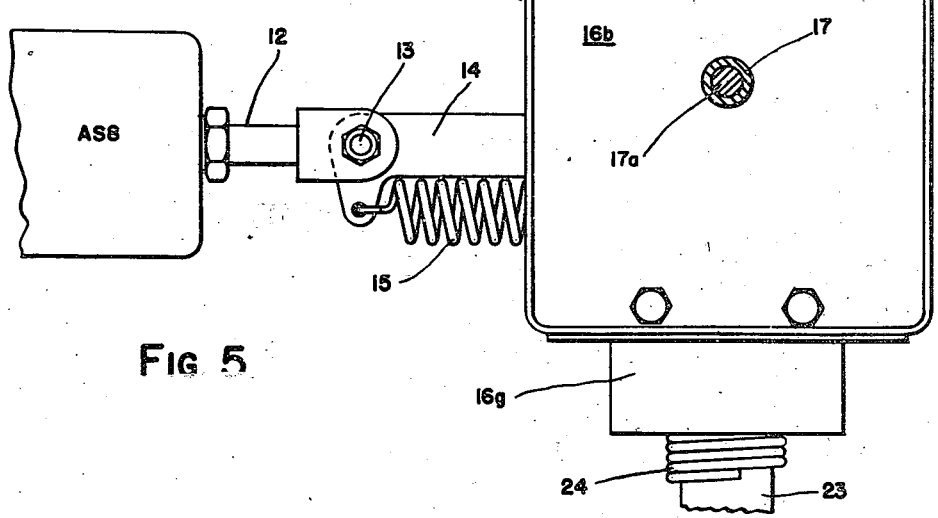
Fig. 5 is an enlarged detail of the arming mechanism shown in the upper left hand portion of Fig. 4.

Each solenoid, as more clearly shown in Figs. 5 and 6, has its movable element 12 connected to a link 14 by the pivot bolt 13. The other terminal of the link 14 is similarly connected to a pair of arms 20 by means of pivot bolts 20p, the arms 20 being welded or otherwise suitably fixed to the arming torque tube 17. The torque tube is constructed in a separate unit between the two channel shaped plates 16a and 16b of each arming unit 16 and also in a separate unit between each two arming units in order that the torque tube may be assembled on the rod 17a. The latter extends in a spanwise direction from the centers of the outermost bombs in the carriage C1 and is suitably journalled in the arming unit 16 which is rigidly supported from a wing bulkhead Ws. A rod 17a extends through the torque tube 17 and is provided with threaded terminals and locking nuts which together with the collars 17b and screws 17c serve to maintain the torque tube in position. A tension spring 15 having one terminal anchored to a downwardly extended lug portion of the link 14, and its other terminal to the arming unit 16, serves to draw the movable core or plunger unit 12 of the solenoid outwardly toward the torque tube 17 as the solenoids are de-energized, or switched into the "off" or "safe" condition. As the solenoids are energized or switched "on" the element 12 is drawn to the left in Figs. 4, 5 and 6, tensioning the springs 15 and rotating the torque tube 17, 90 degrees in a clockwise direction due to its pivotal connection with the torque tube arm 20.

The arming units 16 are each formed of two channel-shaped plates 16a and 16b with their web portions spaced back-to-back, between which is mounted mechanism for latching the torque tube 17 in the desired position, thereby positioning the trip or tongue 23b at the lower terminal of the arming slide bar 23. A pair of torque tube arms 18a are rigidly attached to the torque tube 17 and carry at their outer extremity an apertured or bearing portion 18 engaged by the pivot pin 18p. A ratchet dog 21 is pivotally supported upon the pin 18p for relative movement with respect to the arms 18a, the dog 21 being provided with a pin 21p engaged by the tension spring 19, which is in turn anchored to a similar pin extending between the arms 18a such that the free or outer end of the dog 21 is drawn toward the axis of the torque tube 17, or into alignment with the arms 18a. A toothed ratchet 22 is rotatably mounted upon the rod 17a in the plane of the dog 21, the ratchet having four teeth 22t equally spaced about its circumference which are engageable by the tongue at the outer end of the dog 21. Collars 17b and 17d maintain the location of the ratchet 22. The ratchet 22 is provided with two pins 22a and 22b oppositely and symmetrically disposed with respect to the axis of the torque tube 17 and aligned with a diameter passing through two opposite teeth 22t.

An arming slide bar 23 is disposed between the toothed ratchet 22 and the side 16b of the arming unit. The upper end of the slide bar 23, as may be seen in Figs. 9 and 10, has a widened portion surrounding a D-shaped opening with the straight side of the D disposed horizontally at the upper end of the bar and provided with an arcuate notch 23a disposed along the vertical center line of the slide bar. The notch 23a is engageable by either of the ratchet pins 22a or 22b, or by the torque tube 17 when the pins are horizontally disposed, the radius of the arcuate notch being such that it will accommodate either of these cylindrical elements and permit the slide bar 23 to be suspended from the uppermost element. The slide bar is guided for substantially vertical translation along a line passing through the axis of the torque tube 17 by means of the guide portion 16g of the arming unit 16. A transverse pin 23p serves as a stop for a washer 24a between which and the guide 16g there is disposed a compression spring 24 tending at all times to return the slide bar to its lowermost position or to maintain its notch 23a in engagement with the pin which is uppermost at the time, dependent upon the position into which the toothed ratchet 2. has been rotated by the arming solenoid. The lower terminal of the arming slide bar 23 has attached thereto the tongue portion 23b by means of the threaded stud 23c and the lock washer and nut 23d. All of the arming mechanism described to this point is fixedly mounted within the wing above the bomb-dropping position and serves to actuate the hereinafter described arming mechanism which is carried by the individual bomb carriages as they are moved into the bomb dropping position.

The remainder, or movable portion, of the arming mechanism is carried on the individual carriages and comprises an arming link 25 having a turnbuckle or other suitable means 25a intermediately disposed for adjustment purposes. The arming link 25 is provided at its upper terminal with a tongue element 25b arranged such that it is engaged by the corresponding tongue 23b at the lower end of the above described portion which is fixed to the aircraft wing. The rod or link 25 is guided for vertical movement near its upper terminal by the guide Sa supported upon the carriage. The lower terminal of the arming link 25 is connected, in a manner well known in the art, to the arming mechanism provided within the shackle S such that the operator may release the bomb in either its "armed" or "safe" condition. This is usually accomplished by the removal of a pin in the nose of the bomb permitting the spinner to rotate as the bomb is released and thereby fusing the bomb. In the event the arming link 25 is not pulled upward prior to the release of the bomb, the nose pin remains in position and the bomb is dropped in its "safe" condition.

The releasing system comprises an installation of electrically controlled solenoids similar to that for the arming system with the exception that a solenoid is provided for each bomb carried by the carriages. The releasing solenoids S1 to S8 inclusive are connected in a suitable switch circuit (not shown) by means of the wires 11R and are disposed directly above the centers of each of the five bombs in the carriage, oppositely facing the solenoids for the arming of the bombs. The movable elements 26 of the release solenoids are pivotally connected to an upstanding arm of a bellcrank lever 27 which is mounted for partial rotation about the pivots 27p, the axis of which is disposed parallel to the track, or spanwise of the wing. The lower arm of the bellcrank 27 is provided with a tongue portion which is adapted to engage the tongue 28a fixed to the upper terminal of the releasing links 28, which are supported for vertical movement within the guides Sa carried by the carriages and similarly provided with adjustment turnbuckles 28a intermediate their upper and lower terminals. The lower end of the release link is connected, in a manner well known in the art, by suitable linkage to the bomb hooks 29 such that upward movement of the link 28 causes clockwise rotation of the hooks 29 and their disengagement from the bomb rings 30.

In the event of failure of the electrical release system, an emergency manual release is provided whereby those bombs which are positioned above a wing opening may be simultaneously released or dropped as a salvo by the operator exerting pull on the cable 32. As more clearly shown in Fig. 3, the cable 32 extends spanwise of the wing, being guided above each shackle by a suitable sheave 33 supported between the angles 31. For each bomb in the carriage there is a branch fitting 34 and a branch cable 32a connected to the lower arm of each bellcrank lever 27. The manual release 32 preferably extends into the control cockpit convenient to the pilot and copilot. Accordingly, it will be seen that in the "off" position of the release solenoids, any pull exerted upon the cable 32 will cause partial clockwise rotation of each of the bellcranks 27 in the carriage unit which is properly positioned for release of the bombs. Such rotation of the bellcranks 27 causes engagement with the tongues 28a and upward movement of the links 28, clockwise rotation of the bomb hooks 29 and emergency release of the five bombs in the carriage. As the bombs are released by the manual means the bomb doors are simultaneously opened by the same operation.

It will be noted from the plan view of Fig. 3 that the tongue elements 28a, as well as the portion of the bellcrank 27 engaged by it, are relatively narrow and that unless the bomb carriage is accurately located with respect to the opening, rotation of the bellcrank 27 will clear the tongue 28a and the bombs would not be released. This serves as an additional safety feature inasmuch as it would not be desirable to release any of the bombs in other than the properly centered position of the carriage, as one of the end bombs would be likely to strike or foul the doors, or an edge of the openings. Inasmuch as both the arming and release solenoids are disposed only above the door openings, those carriages which are positioned along the tracks intermediate of, or beyond, the openings cannot possibly be armed electrically or released, either electrically or manually, until they are in the proper positions above the openings where they can be released. The bombs also can be armed manually by a crew member walking out in the wing and removing the arming pin from the nose of each bomb. Suitable mechanism (not shown) is provided for automatically opening and closing the bomb doors before and after release of the bombs, as well as means to insure that the doors are opened before the bombs can be dropped. The doors are also provided with mechanism to prevent their opening before the load is in the proper load-dropping position. The electrical system for the release of the bombs is such that they may be selectively dropped one at a time at predetermined intervals or that either or both carriages disposed above the openings may have their loads released simultaneously in salvos. Preferably the release system is arranged such that each salvo of about five to ten bombs released on one side of the aircraft has its corresponding salvo on the other side of the aircraft released at the same instant so that a laterally balanced condition of the craft is maintained substantially at all times.

Referring again to Figs. 1 and 2 there is shown the carriage C1, containing five bombs in its load-dropping position over opening O1 and carriage C2 of the same outer train of carriages, also containing five bombs, disposed in its load-dropping position above opening O2. Intermediate these two carriages in the outermost train is a carriage C4 of three bombs arranged in the upper row only. The innermost train comprises an outer carriage C3 carrying five bombs and an inner carriage C5 containing three upper row bombs.

Assuming now that each of the bombs in carriages C1 and C2 have been released through openings O1 and O2 and it is desired to bring additional bombs into position for dropping, the motor 45b is started, imparting lateral translation to the chain and cable strands 37, such that the attachments 37a on the latter will move the outermost train until the outer carriage C1 occupies approximately its dotted position shown to the left in Fig. 1. Inasmuch as bombs B1 to B3 inclusive have previously been dropped, the empty carriage C1 will readily clear the wing structural bulkhead as it is moved outwardly. Similarly, the empty carriage C2 is also enabled to clear the bulkhead members as it moves outwardly with the outermost train of carriages. Suitable automatic stop mechanism is provided in the carriage drives such that the motor is stopped and the transmitting mechanism locked when each carriage is in its proper position. As carriage C4 reaches its position above the opening O1 the arming and release links carried by each of its three shackles will be in position to be engaged by the solenoid-operated arming and release devices.

The track composed of rails T1 and T2 extends continuously in a lateral or spanwise direction from points well beyond the outermost doors D1 and D2 of each wing portion to points adjacent the plane of symmetry of the airplane. The conveyor or handling system within each wing portion becomes in effect a compound, or two-part conveyor, each half being made up of a three-carriage outer train unit and a two-carriage inner train unit. This arrangement of separately translatable carriage trains operable upon the same guide tracks provides a flexible and economical unit which permits of the greatest utilization of the available space within the wing while at the same time requiring a minimum of handling and operating mechanism, and gives a maximum bomb capacity translatable through the minimum distances necessary to bring the bombs into their load-dropping positions.

Either simultaneously with the outward movement of the outermost carriage train, or subsequently thereto, the innermost train is moved outwardly by operation of the motor 45a. The door D4 is arranged such that the five bombs in carriage C3 may be carried across this door into its dropping position, the bombs in carriage C3 being either dropped simultaneously with, or before, or after those supported by carriage C4. After the carriages C4 and C3 have been emptied, both trains of carriages are again translated outwardly approximately the length of one carriage until the carriage C5 is disposed directly above the opening O2 through which its bomb load may thereupon be released. The above described bomb dropping sequence is reversed when it is desired to stow the bombs or other cargo in each of the carriages prior to the take-off of the airplane. Obviously, when it is desired that only part of the full load is to be carried by the airplane the corresponding number of carriages can be loaded with the desired number of bombs or other cargo, in which case the outermost carriages would be loaded first in order to keep the weight disposed as far from the plane of symmetry as possible, unless the operations require that the loading be otherwise. It is usually desirable to dispose the bombs or cargo along the wing as far away from the plane of symmetry as possible to increase the negative bending moment acting against the positive bending moment of the wing air load at the wing root.

From the above described arrangement it will be noted that the described storage and handling system permits of a very compact and flexible installation which utilizes substantially all of the available space which the wing structure permits, and other modifications which may occur to those skilled in the art both with respect to general arrangement and detail design are each intended to be embraced within the scope and spirit of the present invention as more clearly defined by the appended claims.

I claim:

1. In a system for handling loads within an aircraft wing having a plurality of spanwise spaced openings in the lower surface thereof, a pair of rectilinear guide rails within said wing extending across said openings from the central portion of the aircraft toward the region of its wing tip, bomb-carrying units having rolling engagement with said guide rails, said carriage units being coupled to form a plurality of separately movable spanwise spaced train units, and means to selectively move said train units individually and jointly along said guide rails to positions above said openings.

2. In combination with an airplane wing having an opening in the lower surface thereof, rectilinear guide means extending in a spanwise direction across said opening, a plurality of bomb-carrying carriages each movable in sequence along said guide means into a predetermined position above said opening, said carriages coupled together to form spanwise spaced trains of interconnected carriages, normally separated releasing mechanism carried upon the wing and upon each said carriage, and normally separated arming mechanism carried upon the wing and upon each said carriage, the said mechanisms on the wing being located such that the respective mechanisms on the carriages are brought into cooperative relationship therewith as the said carriages are moved to said predetermined positions whereby said normally separated mechanisms are adapted for engagement for the arming and release of the bombs on each of said carriages only in the said predetermined position.

3. In a transporting and releasing system for bomb-carrying aircraft, comprising a wing having a plurality of spanwise spaced openings in the lower surface thereof, rectilinear guide means extending in a spanwise direction across said openings, a plurality of interconnected bomb carriages movably associated with said guide means, actuating means to move said carriages along said guide means, each said carriage including a plurality of bomb-carrying shackles, mechanism associated with each said shackle adapted for the arming and release of its bomb, complementary arming and release mechanisms carried by the structure of said wing and adapted to be engageable by the shackle releasing mechanism only when the respective bomb carriage reaches a predetermined position with respect to one of said wing openings.

4. In bomb-carrying aircraft, guide means supported from the aircraft, a carriage movable along said guide means, said carriage being provided with mechanism for the releasable support of a plurality of bombs, a plurality of solenoid-actuated release members pivotally supported upon the aircraft selectively engageable with said carriage mechanism in a predetermined relationship of said carriage with respect to said guide means, remotely disposed means associated with said solenoids for the selective release of said bombs in said predetermined relationship, and manual means associated with said members adapted for the emergency release of all of the bombs from the carriage in its said predetermined relationship.

5. In bomb-carrying aircraft, guide means supported from the aircraft, a carriage movable along said guide means, said carriage adapted to carry a plurality of bombs said carriage provided with mechanism for the arming of each of said bombs, a solenoid-actuated member rotatably supported upon the aircraft, pin-carrying ratchet elements fixed to said rotatable member engageable by said solenoid-actuated mechanism and spring-pressed bar elements engaging said pins and said carriage arming mechanism as determined by the position into which said rotatable member is rotated and the position into which the carriage is moved along said guide means.

6. In a system for handling loads within an aircraft wing having a plurality of openings in the lower surface thereof, continuous guide track extending outwardly from the central portion of the aircraft across said openings, a plurality of load carriage units having rolling engagement with said guide track, said carriage units being coupled to form a plurality of separately movable train units, and means to selectively move said train units along said guide track whereby different trains may be simultaneously loaded or unloaded through each of said openings.

7. In combination with an airplane wing having an opening in the lower surface thereof, guide means extending across said opening, a plurality of cargo-carrying carriages including rollers whereby each said carriage movable in sequence along said guide means into a predetermined position above said opening, normally separated solenoid-actuated means carried upon the wing and upon each said carriage adapted upon engagement to permit loading, upon disengagement to retain and upon re-engagement to permit unloading, said normally separated means being adapted for actuation for the said loading and unloading of said cargo only in the said predetermined position.

8. In a bomb handling system for aircraft including a wing having a plurality of spanwise spaced openings in the lower surface thereof, spanwise track means extending across said openings supported completely within the exterior surfaces of said wing, a plurality of bomb carriages movably associated with said track means, each said carriage adapted to releasably support a plurality of bombs entirely within said wing, means to selectively and separately move said carriages along said track means into bomb releasing positions above said openings, and means to selectively arm and release a plurality of bombs from their respective carriages when disposed in predetermined positions with respect to each of said wing openings.

9. A load handling system for an aircraft wing having at least two laterally spaced openings in the lower surface thereof, comprising a plurality of independently translatable load carrying trains disposed within said wing and movable across said openings, track means extending in a spanwise direction within said wing and across said openings, selective control means to independently or jointly move said trains along said track means, the inner said train containing at least two loading carriages, the outer said train containing at least three loading carriages, whereby the inner said train may be loaded through the inner wing opening and moved laterally to permit simultaneous loading of two carriages of said outer train simultaneously through said inner and outer wing openings.

10. In a system for handling loads within an aircraft wing having an opening in the lower surface thereof, guide means within said wing extending across said opening in the spanwise direction of said wing, load-carrying units having rollers in engagement with said guide means, said load-carrying units being coupled to form a plurality of separately movable spanwise spaced train units, and means to selectively move said train units both individually and jointly along said guide means to positions above said opening.

11. A bomb-carrying system for aircraft including a wing having an opening in the lower surface thereof, guide means disposed across said opening, bomb-carrying carriages having rolling engagement with said guide means, said carriages coupled together to form trains of interconnected carriages, said bomb carriages comprising a plurality of shackles staggered both vertically and horizontally adapted to accommodate at least two superposed rows of bombs, means to selectively roll said bomb carriages both individually and jointly from stowed positions to a bomb-dropping position above said opening, and means associated with said wing and with said carriages for the selective release of the bombs from their respective shackles for operation only when said bomb dropping position is reached.

12. A transporting and releasing system for bombing aircraft, comprising a wing having a plurality of spanwise spaced openings in the lower surface thereof, guide means extending in a spanwise direction across said openings, a plurality of bomb carriages movably associated with said guide means, a plurality of bombs carried by each said carriage, said carriages being coupled together to form two or more separate carriage train units movable along a common portion of said guide means, and selective actuating means adapted to individually move one carriage of either of said train units into a bomb-dropping position above one of said doors, said actuating means also adapted to selectively move a plurality of carriages toward their respective openings, and bomb-release means made operative only upon movement said carriages into their respective bomb-dropping position.

13. In a load-carrying system for aircraft, a wing having a plurality of spanwise spaced openings in its lower surface, rectilinear guide means extending in a spanwise direction within said wing across said openings, at least two load-carrying trains movably associated with said guide means, each said train comprising two or more load carriages, at least one load carriage in each train adapted to releasably carry its load in two superposed staggered rows, selective means to release said load from its respective carriage operable only when over one of said openings, and means for the selective translation of said trains either individually or jointly into positions above said openings at which said load may be released.

14. A cargo-carrying system for an aicraft, including a wing having a plurality of spanwise spaced openings in the lower surface thereof, comprising a guide track extending in a spanwise direction within each of the opposed portions of the wing and across said openings, a plurality of cargo-carrying means movable along said guide track, and centrally disposed power means for selectively imparting individual or joint movements to said cargo-carrying means either away from or toward the longitudinal plane of symmetry of said aircraft whereby a plurality of said means may be simultaneously loaded or unloaded through openings in both opposed portions of said wing without disturbing the load balance about said plane of symmetry.

15. In a system for handling loads within an aircraft wing having an opening through the lower surface thereof, track means within said wing extending across said opening from a load-stowed position to a load-releasing position above said opening, load-carrying carriages in engagement with said track means for movement therealong, said load-carrying carriages being separated and spaced from each other along said track means, and means to selectively move said carriages both individually and jointly along said track means from the stowed to the releasing position of said load above said opening.

16. In load-carrying aircraft having a wing with an opening through the lower surface thereof, spanwise track means within said wing extending from a load-stowed position to a load-releasing position adjacently disposed above said opening, a carriage translatable along said track means, releasing mechanism associated with said carriage for the releasable suspension of a load therefrom, drive means in engagement with said carriage adapted for its translation along said track means between said stowed and releasing positions, trip mechanism movable within a vertical plane transversely of said track means carried by said wing disposed adjacent said wing opening, said releasing mechanism disposed within the said vertical plane defining the path of movement of said trip mechanism and actuating means to selectively operate said trip mechanism for its engagement with said releasing mechanism adapted to effect the release of said load from said carriage only when the same has been translated into the said load releasing position.

THEODORE P. HALL.